United States Patent Office 3,651,131
Patented Mar. 21, 1972

3,651,131
PROCESS FOR CONVERTING TRIALKYL-ALUMINUM COMPOUNDS TO ALUMINUM ALKOXIDES
Russell G. Hay, Gibsonia, and John G. McNulty and William L. Walsh, Glenshaw, Pa., assignors to Gulf Research & Development Company, Pittsburgh, Pa.
No Drawing. Filed Nov. 17, 1969, Ser. No. 877,423
Int. Cl. C07f 5/06
U.S. Cl. 260—448 AD
8 Claims

ABSTRACT OF THE DISCLOSURE

A process for converting trialkylaluminum compounds to aluminum alkoxides which involves subjecting the trialkylaluminum compound to contact with molecular oxygen at moderate temperatures in the presence of a metallic compound of copper, iron, manganese, chromium, cesium, vanadium, titanium, nickel, magnesium, aluminum or zirconium.

---

This invention relates to a process for converting a trialkylaluminum compound to an aluminum alkoxide in the presence of a specific metallic compound soluble in the trialkylaluminum at moderate temperatures without the formation of appreciable amounts of undesirable by-products.

The oxidation of trialkylaluminum compounds to aluminum trialkoxides is highly desirable because, for example, the aluminum trialkoxides can be hydrolyzed by conventional procedures to obtain alcohols corresponding to the alkoxide portion of said aluminum trialkoxides. The oxidation of the majority, for example, about 85 percent, of the alkyl substituents on the trialkylaluminum is not especially difficult. Thus, Dr. Karl Ziegler in his article "Synthesis Of Alcohols From Organo Aluminum Compounds" in Annalen der Cheme, volume 629, Nos. 1–3, March 1960, pages 241 to 250 states the following: "When one makes no specially high demands for a quantitative course of the oxidation and is satisfied with 70 to 80 percent yields (occasionally also more) then the process is simple and presents no problems. When one examines it more closely then one runs into a series of complications which need further study. This publication relates first only to the first stage of development of the research. The question of the last percents of the yield remains untouched." At relatively low temperatures quantitative conversions of trialkylaluminum compounds to aluminum trialkoxides is essentially not obtained in a reasonable time. At increased temperatures levels higher conversions can be obtained, but, unfortunately, an unacceptable level of by-products formation, that is, conversion of alkyl and/or alkoxide to saturated hydrocarbons, olefinic hydrocarbons and alcohols results.

We have found that substantially quantitative conversion of trialkylaluminum can be obtained, with increased yields of aluminum alkoxide, at relatively low temperatures by subjecting the trialkylaluminum compound to contact with molecular oxygen in the presence of a specific metallic compound soluble in said trialkylaluminum compound.

The reaction can be effected in any suitable conventional manner, that is, by bringing together the trialkylaluminum having dissolved therein the defined metallic compound and molecular oxygen, for example, oxygen itself or air. The amount of oxygen necessary is that amount stoichiometrically required to convert the alkyl group to the corresponding alkoxide substitutent, but in general from about 20 to about 100 percent by volume in excess of that stoichiometrically required is recommended.

The metallic compound soluble in the trialkylaluminum compound that must be used is selected from the group of compounds of copper, iron, manganese, chromium, cesium, vanadium, titanium, nickel, magnesium, aluminum or zirconium. Specific examples of suitable metallic compounds are $CuCl_2$, $Cu_2Cl_2$, copper acetyl acetate, cuprous acetate, cupric acetate, $FeCl_3$, iron acetyl acetate, ferrous acetate, ferric acetate, $MnCl_2$, manganese acetyl acetonate, manganese acetate, $CrCl_3$, chromium acetyl acetonate, chromous acetate, chromic acetate, $CeCl_3$, cerium acetyl acetonate, cerious acetate, ceric acetate, vanadyl chloride, vanadium acetyl acetonate, 2,4-pentadiene vanadyl, vanadyl acetate, titanium acetyl acetonate, titanium tetrachloride, $NiCl_2$, nickel acetyl acetonate, aluminum acetyl acetonate, zirconium acetyl acetonate, magnesium acetyl acetonate, etc. The amount of metallic compound used can vary over a wide range, for example, from about 0.05 to about 30 percent by weight, preferably from 0.1 to about 2.0 percent by weight based upon the trialkylaluminum compound.

The trialkylaluminum compound that can be employed as charge can be defined by the following general formula

where $R_1$, $R_2$ and $R_3$, the same or different, can be an alkyl group having from two to 40 carbon atoms, preferably from two to 30 carbon atoms. Specific examples of suitable normal trialkylaluminum compounds are triethylaluminum, tributylaluminum, trihexylaluminum, tripropylaluminum, tripentylaluminum, triheptylaluminum, trioctylaluminum, tridecylaluminum, tridodecylaluminum, trinonylaluminum, triundecylaluminum, tri-tridecylaluminum, tritetradecylaluminum, trihexadecylaluminum, trioctadecylaluminum, tripentadecylaluminum, triheptadecylaluminum, trinonadecylaluminum, ethylbutylhexylaluminum, butylpentyldodecylaluminum, ethyldecyloctylaluminum, etc.

The only critical variable in the reaction conditions is the temperature, which can be as low as about $-10°$ C. but never any higher than about $50°$ C., preferably within the range of about $30°$ to about $45°$ C. Pressure is not critical and can be from about 0 to about 1000 pounds per square inch gauge, preferably from about 0 to about 30 pounds per square inch gauge. Reaction time of about one-third to about five hours, preferably from about one-half to about two hours, will suffice. At the end of the reaction period, the pressure is reduced, volatile products are removed by distillation at reduced pressures, for example, from about one to three millimeters of mercury. The latter can, in a preferred embodiment, be subjected to hydrolysis, using conventional means, for example, about five to about 80 percent aqueous HCl or $H_2SO_4$ at a temperature of about $0°$ to about $60°$ C., to obtain an alcohol corresponding to the alkoxide groups on the aluminum trialkoxide.

The process defined herein can be further illustrated by the following. A series of runs was made in a three-necked, 500-milliliter, round-bottomed Morton flask equipped with a thermometer, a magnetic stirrer and inlet and outlet line ports for air or oxygen. In each case between 100 and 150 grams of a trialkylaluminum product, wherein the alkyl substituents had from four to 40 carbon atoms, with the average being an alkyl group having 12 carbon atoms, was placed in the flask along with about 38 percent by weight thereof of heptane. The trialkylaluminum growth product was obtained from a continuously operated 11,018 milliliter tube reactor (½ inch diameter and 257 feet in length) submerged in an oil bath at 230° F. The charge consisting of 54.7 weight percent ethylene, 11.59 weight percent triethylaluminum and 33.94 weight percent heptane was fed at a rate of 8.039 pounds per hour per cubic foot of reactor. Reactor pressure was maintained at 3500 pounds per square inch gauge. The residence time was two and one-half to three hours and gave a trialkylaluminum product wherein the alkyl substituents had from two to 40 carbon atoms, with the average alkyl having 12 carbon atoms. Ethylene conversion was 80.9 percent, giving a productivity of 3.5426 pounds of ethylene converted per hour per cubic foot of reactor. Air or oxygen was continuously introduced into the flask at a rate such that only detectable amounts of air or oxygen were continuously withdrawn therefrom. The pressure was maintained at atmospheric pressure and the temperature was controlled by external cooling. In several of the runs the aluminum alkoxide product was subjected to hydrolysis with 12 percent aqueous HCl to determine the amount of alkoxides that had been obtained. Analysis in all cases was made by gas-liquid chromatography. The results are tabulated below in Table I.

The fact that all of the alkyl groups on the trialkylaluminum are converted to alkoxides in accordance with the procedure defined herein is of significant value. Even if it be assumed when there is less than 100 percent conversion of trialkylaluminum, as in Run No. 1, that, nevertheless, all of said conversion is to aluminum trialkoxides, great difficulty arises in separating the latter from the unreacted trialkylaluminum, for example, by simple distillation. If the entire product is subjected to hydrolysis, as defined above, the aluminum trialkoxides are converted, desirably to alcohols, but the unreacted trialkylaluminum is converted to aluminum hydroxide and hydrocarbons. The latter are difficult to separate from the desired alcohols.

When 100 percent conversion of trialkylaluminum occurs, as defined herein, not only is there an increased yield of aluminum trialkoxides, as shown, for example, in Runs Nos. 4 and 6, the formation of by-product carbonyls, hydrocarbons and/or alcohols, creates no serious problem, for they can be separated, for example, by distillation, from the aluminum trialkoxides quite easily. After such

TABLE I

| Run No. | Catalyst | Weight percent of catalyst based on the total charge | Gas | Induction period, mins. | Reaction time, hours | Average temperature, °C. | Conversion of trialkyl aluminum, mol percent | Weight percent alcohols based on trialkylaluminum |
|---|---|---|---|---|---|---|---|---|
| 1 | | | $O_2$ | 5 | 3 | 32.3 | 64.5 | |
| | | | $O_2$ | | 2 | 32.9 | 69.8 | |
| | | | Air | 5 | 1 | 32.9 | | |
| 2 | | | $O_2$ | | 2 | 32.9 | 49.7 | |
| | | | $O_2$ | | 2 | 32.9 | 64.0 | |
| 3 | | | $O_2$ | 5 | 4 | 38.4 | 68.2 | |
| | $CuCl_2$ | 0.31 | $O_2$ | 15 | 1 | 34.3 | 100 | |
| 4 | $CuCl_2$ | 0.51 | $O_2$ | <15 | 3 | 38.9 | 100 | 94.3 |
| 5 | | | $O_2$ | 5 | 3 | 40.3 | 61.0 | |
| | $CuCl_2$ | 0.46 | $O_2$ | <15 | 1 | 39.8 | 100 | |
| | | | Air | 5 | 1 | 42.7 | | |
| 6 | | | $O_2$ | | 2 | 42.7 | 64.3 | |
| | $FeCl_3$ | 0.5 | $O_2$ | 5 | 1 | 37.8 | 100 | 98.0 |
| | | | Air | 5 | 1¼ | 42.6 | | |
| 7 | | | $O_2$ | | 4¾ | 42.6 | 67.0 | |
| | $MnCl_3$ | 0.5 | $O_2$ | 20 | 1 | 44.7 | 100 | |
| 8 | | | Air | 5 | 1¼ | 42.6 | 67 | |
| | $CrCl_3$ | 0.5 | $O_2$ | 30 | 1 | 38.4 | 100 | |
| 9 | | | Air | 5 | 1¼ | 42.6 | 67 | |
| | $CeCl_3$ | 0.5 | $O_2$ | 30 | 1½ | 35.7 | 100 | |
| 10 | | | Air | 5 | 1¼ | 42.6 | 67 | |
| | 2,4 pentadione vanadyl | 0.5 | $O_2$ | 2 | ¾ | 38.8 | 100 | |
| 11 | | | Air | 5 | 1¼ | 42.6 | 67 | |
| | Titanium acetyl acetonate | 0.5 | $O_2$ | 5 | 1 | 38.4 | 100 | |
| 12 | | | Air | 5 | 1¼ | 42.6 | 67 | |
| | Nickel acetyl acetonate | 0.5 | $O_2$ | 1 | 1 | 39.3 | 100 | |
| | | | Air | 5 | 1¼ | 42.6 | 67 | |
| 13 | | | $O_2$ | | 1 | 29.0 | 69.6 | |
| | Magnesium acetyl acetonate | 0.5 | $O_2$ | 3 | 1 | 41.1 | 100 | |
| 14 | | | Air | 5 | 1¼ | 42.6 | 67 | |
| | Aluminum acetyl acetonate | 0.5 | $O_2$ | 55 | 1 | 47.8 | 100 | |
| 15 | | | Air | 5 | 1¼ | 42.6 | 67 | |
| | Zirconium acetyl acetonate | 0.5 | $O_2$ | 55 | 1¼ | 37.1 | 100 | |

The advantages of operating in accordance with our procedure is apparent from the above data. In Run No. 1 at the end of the first three hours reaction had virtually ceased at 64.5 percent conversion. An additional two hours was able to raise the conversion to 69.8 percent. To much the same effect is Run No. 2. In Run No. 3 without catalyst at the end of four hours a conversion of only 68.2 percent was obtained. When $CuCl_2$ was added, however, and reaction continued for an additional hour at about the same temperature level quantitative conversion of the trialkylaluminum was obtained. In Run No. 4 when the $CuCl_2$ was added initially substantially complete conversion was obtained at the end of three hours. In fact, in each of the runs in the table substantially complete conversion was obtained at low temperatures in a relatively short period of time in the presence of the defined catalyst. In each of Runs Nos. 4 ad 6 hydrolysis of the product showed that 94.3 percent and 98.0 percent of the alkyl groups on the trialkylaluminum charge were converted to alkoxides on the basis of the alcohol obtained.

separation, the hydrolysis of aluminum trialkoxides by conventional means to alcohols is easily effected.

Obviously, many modifications and variations of the invention, as hereinabove set forth, can be made without departing from the spirit and scope thereof, and therefore only such limitations should be imposed as are indicated in the appended claims.

We claim:

1. A process for converting trialkylaluminum compounds to aluminum alkoxides which comprises subjecting the trialkylaluminum compound to contact with molecular oxygen at a temperature of about —10° to about 50° C. in the presence of about 0.05 to about 30 percent by weight, based on the trialkylaluminum compound, of a salt or an acetyl acetonate soluble in the trialkylaluminum compound of a metal selected from the group consisting of copper, cesium and magnesium in the absence of a potassium salt.

2. The process of claim 1 wherein the metallic salt is $CuCl_2$.

3. The process of claim 1 wherein said temperature is in the range of about 30° to about 45° C.

4. The process of claim 1 wherein the amount of said metallic compound is from about 0.1 to about 2.0 percent by weight, based upon the trialkylaluminum compound.

5. The process of claim 1 wherein the trialkylaluminum is one wherein each alkyl substituent has from two to 40 carbon atoms.

6. The process of claim 1 wherein the trialkylaluminum is one wherein each alkyl substituent has from two to about 30 carbon atoms.

7. The process of claim 1 wherein the metallic salt is $CeCl_3$.

8. The process of claim 1 wherein the metallic salt is magnesium acetyl acetonate.

References Cited

UNITED STATES PATENTS

| | | | |
|---|---|---|---|
| 3,016,397 | 1/1962 | Walde | 260—448 AD |
| 3,070,616 | 12/1962 | Flanagan | 260—448 AD |
| 3,257,468 | 6/1966 | Dickey et al. | 260—448 AD X |
| 3,262,957 | 7/1966 | Roha et al. | 260—448 AD |
| 3,322,806 | 5/1967 | Asinger et al. | 260—448 A |
| 3,387,014 | 6/1968 | Trebillon | 260—448 AD |
| 3,412,127 | 11/1968 | Napier | 260—448 AD |
| 3,475,476 | 10/1969 | Cragg et al. | 260—448 AD |
| 3,475,477 | 10/1969 | Muller et al. | 260—448 A |

TOBIAS E. LEVOW, Primary Examiner

H. M. S. SNEED, Assistant Examiner